June 2, 1959 J. L. BOYER ET AL 2,889,498

SEMICONDUCTOR RECTIFIER ASSEMBLY

Filed Nov. 8, 1955 3 Sheets-Sheet 1

WITNESSES

Edwin E. Bassler

Wm. B. Sellers.

INVENTORS
John L. Boyer, Herbert C. McWilliams
and August P. Colaiaco
BY F. P. Lyle
ATTORNEY June 2, 1959 J. L. BOYER ET AL 2,889,498

SEMICONDUCTOR RECTIFIER ASSEMBLY

Filed Nov. 8, 1955 3 Sheets-Sheet 3

United States Patent Office 2,889,498 Patented June 2, 1959

2,889,498

SEMICONDUCTOR RECTIFIER ASSEMBLY

John L. Boyer, Forest Hills, Herbert C. McWilliams, Monroeville, and August P. Colaiaco, Penn Township, Allegheny County, Pa., assignors to Westinghouse Electric Corporation, East Pittsburgh, Pa., a corporation of Pennsylvania Application November 8, 1955, Serial No. 545,668

7 Claims. (Cl. 317—234)

The present invention relates to semiconductor rectifiers, and more particularly to a semiconductor power rectifier assembly.

Semiconductor materials suitable for use in rectifiers, such as germanium and silicon, may be of either of two conductivity types. N-type material is characterized by an excess of electrons and conduction takes place because of the presence of these excess electrons. P-type material is characterized by a deficiency of electrons in the crystal structure of the material, resulting in so-called holes in the valence bonds between adjacent atoms, and conduction takes place by means of an apparent movement of these holes, which act like positive charges. Semiconductor materials of either of these conductivity types can be produced by adding very small amounts of certain impurities to the pure material. These impurities may be donor impurities which contribute excess electrons, resulting in N-type material, or they may be acceptor impurities which lack electrons to complete the valence bonds, resulting in P-type material. These materials have rectifying properties, and if a body of semiconductor material has adjoining zones of N-type and P-type material, the junction between these zones acts as a rectifying layer or barrier, which has low impedance to current flow from the P-type to the N-type material but very high impedance to current flow from the N-type to the P-type material.

These P–N junction rectifiers have very desirable characteristics, since they are capable of withstanding relatively high reverse voltages and can carry high current densities in the forward direction with good efficiency. These devices, therefore, are suitable for use as power rectifiers and can handle relatively large amounts of power if the rectifying junction is made of sufficient area.

In order to obtain high current ratings for these devices, however, it is necessary to provide for the best possible heat transfer from the semiconductor material to prevent excessive temperature rise. These materials have quite definite temperature limits which must not be exceeded, since if the material becomes too hot, its reverse impedance is rapidly decreased, resulting in large leakage currents with further heating and damage to the rectifier. The semiconductor material is heated during operation by the losses due to the load current, and to a very small extent by the leakage current, and since the semiconductor body itself is of very small physical size, a relatively large amount of heat is generated in a small volume, so that the temperature will rise above the permissible limit unless very effective cooling means are provided. It is necessary, therefore, to provide for the best possible cooling of the rectifier in order to obtain high current ratings without exceeding the maximum permissible temperature.

Semiconductor devices are very sensitive to moisture, and to the presence of other impurities, and even very small amounts of moisture and other impurities will adversely affect the characteristics or the life of the device. The rectifier must, therefore, be adequately sealed to protect it from moisture and other impurities in order to obtain good performance and long life. The semiconductor materials used in these rectifiers are also quite brittle, and the thin wafers which must be used to obtain sufficient area with low forward resistance are very fragile, so that the rectifier must be protected against any substantial mechanical stresses in order to prevent breakage of the fragile semiconductor material.

Thus, the design of a practical semiconductor power rectifier involves numerous difficult problems because of the necessity of meeting the requirements of adequate cooling, protection against moisture and other impurities, and protection against mechanical stresses on the semiconductor material.

In the co-pending application of J. L. Boyer and A. P. Colaiaco, Serial No. 404,086, filed January 14, 1954, there is disclosed and claimed a sealed semiconductor rectifier device which very effectively meets these requirements. In this device, the semiconductor rectifier cell itself is soldered on a copper supporting base which also serves as a terminal, and the rectifier cell is enclosed in a sealed enclosure which is joined to the base around the rectifier cell. A flexible conductor is attached to the other side of the rectifier cell to provide for electrical connection without imposing any substantial mechanical stresses on the fragile semiconductor material. The base or terminal member has a relatively heavy portion extending outside the sealed enclosure, and is cooled by circulation of water through suitable water passages or by circulation of air over fins or other radiating surfaces.

In this device, therefore, the cooling system is an integral part of the rectifier device or unit. This construction thus increases the cost of the rectifier unit by adding the cost of the cooling system to that of the rectifier itself, and it also has the disadvantage that in case of failure of the rectifier, the entire assembly including the cooling means must be removed and replaced. In the case of water cooled units, this also requires disconnecting the device from the water system and connecting a new unit in its place, involving additional difficulty and expense. In a water cooled installation of this type separate water connections must be made to each unit, which is frequently difficult and expensive, especially if there are a relatively large number of units, as well as requiring numerous joints with increased possibility of leaks.

The principal object of the present invention is to provide an improved semiconductor rectifier assembly in which the cooling system is separated from the rectifier device itself, so that the rectifier can be replaced if necessary without disturbing the cooling system.

Another object of the invention is to provide a semiconductor rectifier assembly in which the rectifier device or unit is removably mounted on a supporting conductor which has means for dissipating heat, so that the cooling system is separate from the rectifier device itself and the rectifier can be replaced without disturbing the cooling system, thus making it possible to utilize a permanent cooling system.

A further object of the invention is to provide a semiconductor rectifier assembly in which the rectifier device is mounted on a cooled supporting conductor, which may be a bus bar carrying a number of rectifier devices, and in which the rectifier device is mounted on the conductor in such a manner that it can readily be removed and replaced if necessary but is attached to the conductor with a large area contact of good thermal and electrical conductivity, so that the rectifier is cooled susbtantially as effectively as though the cooling system were integral with the rectifier itself.

Other objects and advantages of the invention will be apparent from the following detailed description, taken in connection with the accompanying drawings, in which.

Figure 1:
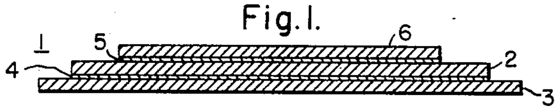
Figure 1 is a transverse sectional view of a typical semiconductor rectifier cell or diode.

The present invention provides a rectifier assembly in which any suitable type of sealed semiconductor rectifier device may be used. Fig. 1 shows, by way of illustration, a typical semiconductor rectifier cell which may be used in such a rectifier device, the particular cell shown being of the type disclosed and claimed in the co-pending application mentioned above. Fig 1 shows a transverse section of the rectifier cell, the thicknesses of the various layers being greatly exaggerated in the drawing for clarity of illustration. The rectifier cell 1 includes a semiconductor body 2, which may be either germanium or silicon, and which is preferably in the form of a thin wafer to provide the necessary area for high current ratings and to have low resistance in the forward direction. The semiconductor body 2 is preferably N-type material and is cut from a single crystal. The semiconductor 2 is mounted on a metal support plate 3 and joined to it with an ohmic contact by a thin layer of solder 4, which may be pure tin if the semiconductor material is germanium, and which may be a suitable solder of higher melting point such as a silver alloy if the semiconductor is silicon.

A layer of an acceptor material 5 is applied to the opposite side of the semiconductor 2. Any suitable acceptor material may be used, indium being preferred if the semiconductor is germanium, and aluminum being preferably used if the semiconductor is silicon. The acceptor material 5, when heated to the proper temperature during manufacture, alloys with the adjacent semiconductor material and diffuses into it, thus converting a portion of the material to P-type to form a rectifying junction. An upper support plate 6 is placed on the acceptor material 5 and is bonded to the cell by the acceptor material. The support plates 3 and 6 provide mechanical support for the semiconductor material and provide for electrical contact to it. These plates are preferably made of molybdenum or tungsten because these materials have good thermal conductivity for effective heat transfer from the semiconductor material and have coefficients of thermal expansion close to those of both germanium and silicon, so that no substantial stresses are imposed on the semiconductor material by differential expansion when the cell is heated either during manufacture or in service.

Figure 2:
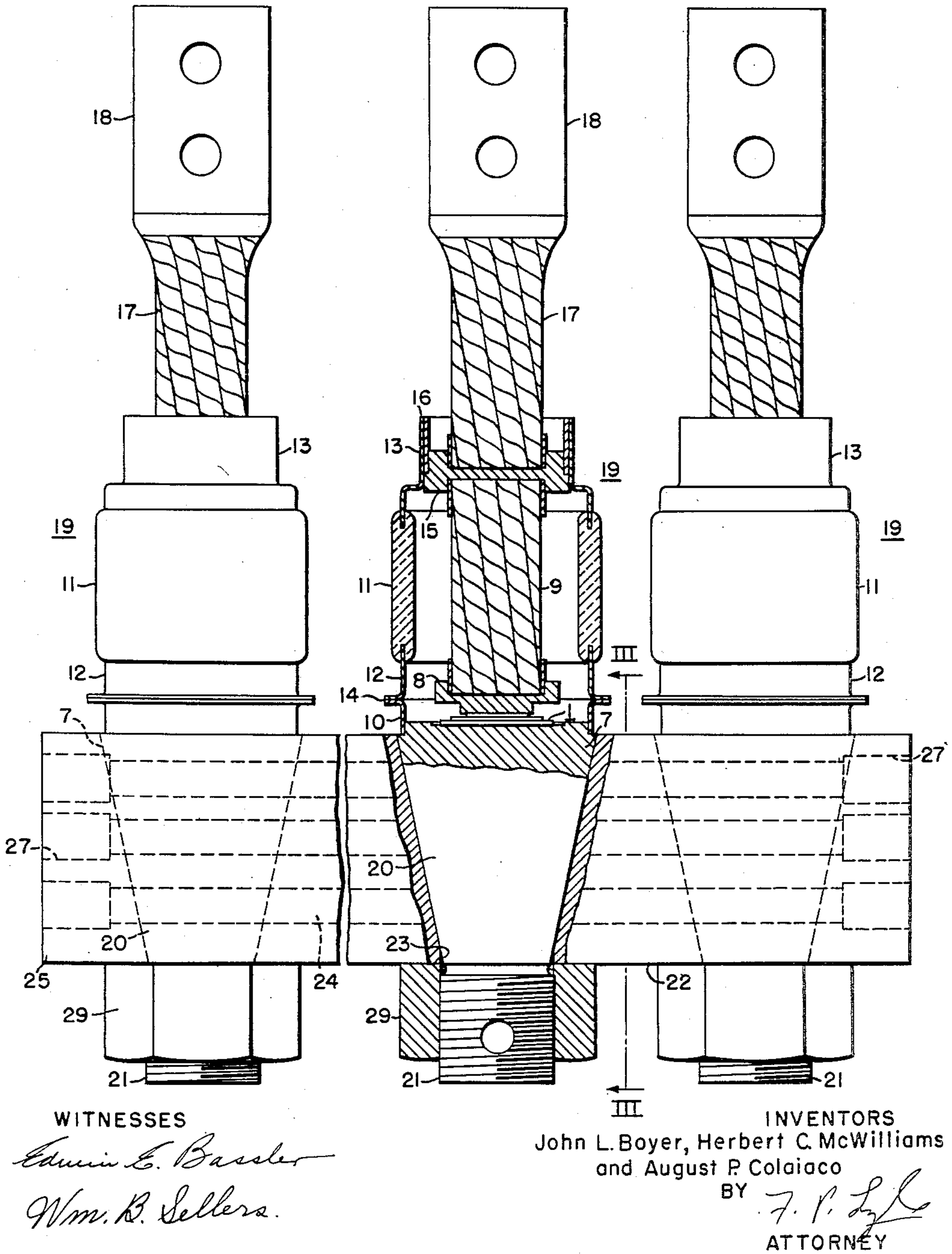
Fig. 2 is a view in elevation, and partly in vertical section, of a rectifier assembly embodying the invention.

The rectifier cell 1 is enclosed in a sealed enclosure, such as that shown in Fig. 2, which may be similar to the structure of the co-pending application mentioned above. As shown in the drawing, the rectifier cell 1 is mounted on a relatively heavy copper terminal member or base 7, which supports the cell and provides electrical connection to one side of the rectifier cell, one of the support plates 3 or 6 preferably being soldered directly to the terminal member 7. A second terminal 8 may be soldered to the upper support plate of the rectifier cell and a flexible conductor 9 is soldered to the terminal 8. The conductor 9 is shown as a stranded copper cable capable of carrying heavy currents, of the order of hundreds of amperes, and which is sufficiently flexible to protect the rectifier cell from any substantial mechanical stress.

The sealed enclosure in which the rectifier cell 1 is contained is attached to the terminal 7 by means of a flange 10 which may be made of stainless steel and is brazed to the upper part of the terminal member 7. A glass tube 11 encloses the assembly and is provided with sleeves 12 and 13 made of a suitable material capable of forming a permanent air-tight seal with glass, such as the iron-nickel-cobalt alloy known as Kovar. The sleeves 12 and 13 are fused to the glass tube 11, as shown, to form hermetic seals, and the lower sleeve 12 is brazed or welded to the flange 10 to form a gas-tight seal at 14. A conducting closure member 15 closes the upper end of the glass tube 11 and may be brazed or welded to the sleeve 13 at 16 to form a gas-tight seal, completing the enclosure. The flexible conductor 9 is attached to the closure member 15 and a similar flexible conductor 17 is attached to the outside of the closure member to provide for connection to the upper side of the rectifier cell. A terminal member 18 of any suitable type may be provided on the conductor 17 to provide for connection to a bus bar. The enclosure within the glass tube 11 is preferably evacuated to remove all traces of moisture and may then be filled with dry air or a dry inert gas such as argon or helium.

A particular sealed rectifier construction has been shown and described for the purpose of illustration, but it will be apparent that the rectifier device or unit itself may be of any suitable construction, such as that shown in another co-pending application of J. L. Boyer and A. P. Colaiaco, Serial No. 529,304, filed August 18, 1955, for example, or any other suitable construction.

In accordance with the present invention the complete rectifier device 19 is removably mounted on a supporting conductor provided with heat dissipating means, so that the rectifier device itself is separated from the cooling means. In the embodiment of the invention shown in Figs. 2 and 3, the terminal member 7 of the rectifier device is a relatively massive copper member and the portion 20 outside the sealed enclosure is made substantially conical in shape. A threaded portion 21 extends below the conical portion 20 and is provided with a relatively heavy thread so that considerable force can be exerted on the device.

Figures 3, 6:
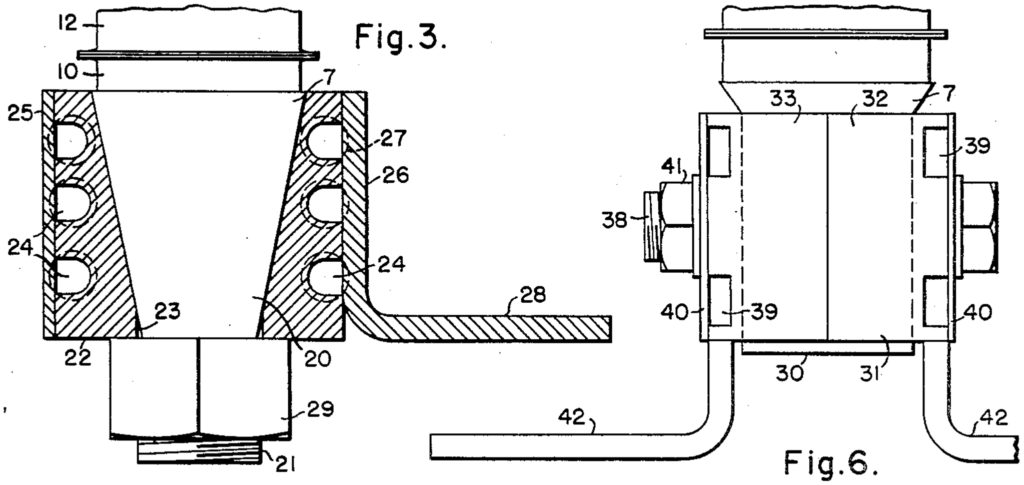
Fig. 3 is a partial transverse sectional view of the structure of Fig. 2, substantially on the line III—III of Fig. 2.
Fig. 6 is a partial end view of the structure of Fig. 4.

The supporting conductor shown in Figs. 2 and 3 is in the form of a relatively heavy bus bar 22 which has sufficient cross-sectional area to carry high currents and which is adapted to support a plurality of rectifier devices, any suitable number being used depending on the requirements of a particular installation. The conductor 22 has a plurality of openings 23 extending through it for the reception of the rectifier units. The openings 23 are tapered so as to provide conical sockets adapted to receive the conical portions 20 of the rectifier devices 19. The conductor 22 has a plurality of longitudinal recesses or passages 24 on each side thereof and these passages are closed by copper plates 25 and 26 on opposite sides of the conductor which are brazed to the conductor to form water-tight joints, so that the passages 24 serve for the circulation of water or other cooling liquid, the ends of these passages preferably being counterbored, as indicated at 27, to receive suitable water fittings. The plate 26 at one side of the conductor 22 may have an angularly extending portion 28, if desired, for mounting the assembly.

The rectifier devices 19 are mounted on the conductor 22 by inserting the conical portions 20 of their terminal members 7 in the corresponding openings 23 of the conductor 22. A nut 29 is threaded on the portion 21 of each rectifier device, which extends below the conductor 22, and tightened to solidly clamp the rectifier device in the conductor 22. If desired, either or both of the mating surfaces of the conical portion 20 and the opening 23 may be silver plated to improve the contact, or a thin foil of silver may be inserted between them for this purpose. It will be seen that a large-area contact is provided between the rectifier device and the conductor 22, so that good thermal and electrical conductivity are obtained, and very effective heat transfer is achieved from the rectifier cell 1 through the terminal element 7 to the conductor 22, from which the heat is dissipated by circulation of water. The tapered or conical shape described has the advantages of providing a relatively large contact area and of amplifying the force applied in tightening the nut 29, so that very intimate contact is obtained and very effective heat transfer results.

It wil be obvious that, if desired, the conductor 22 might be air-cooled instead of water-cooled, by eliminating the passages 24 and providing suitable fins or radiating surfaces on the conductor. It will also be obvious that the invention is not restricted to the multiple unit assembly shown but may be applied to a single rectifier device by making the supporting conductor 22 of smaller size, with a single opening 23 and provided with suitable water passages or radiating surfaces for cooling.

Figure 4:
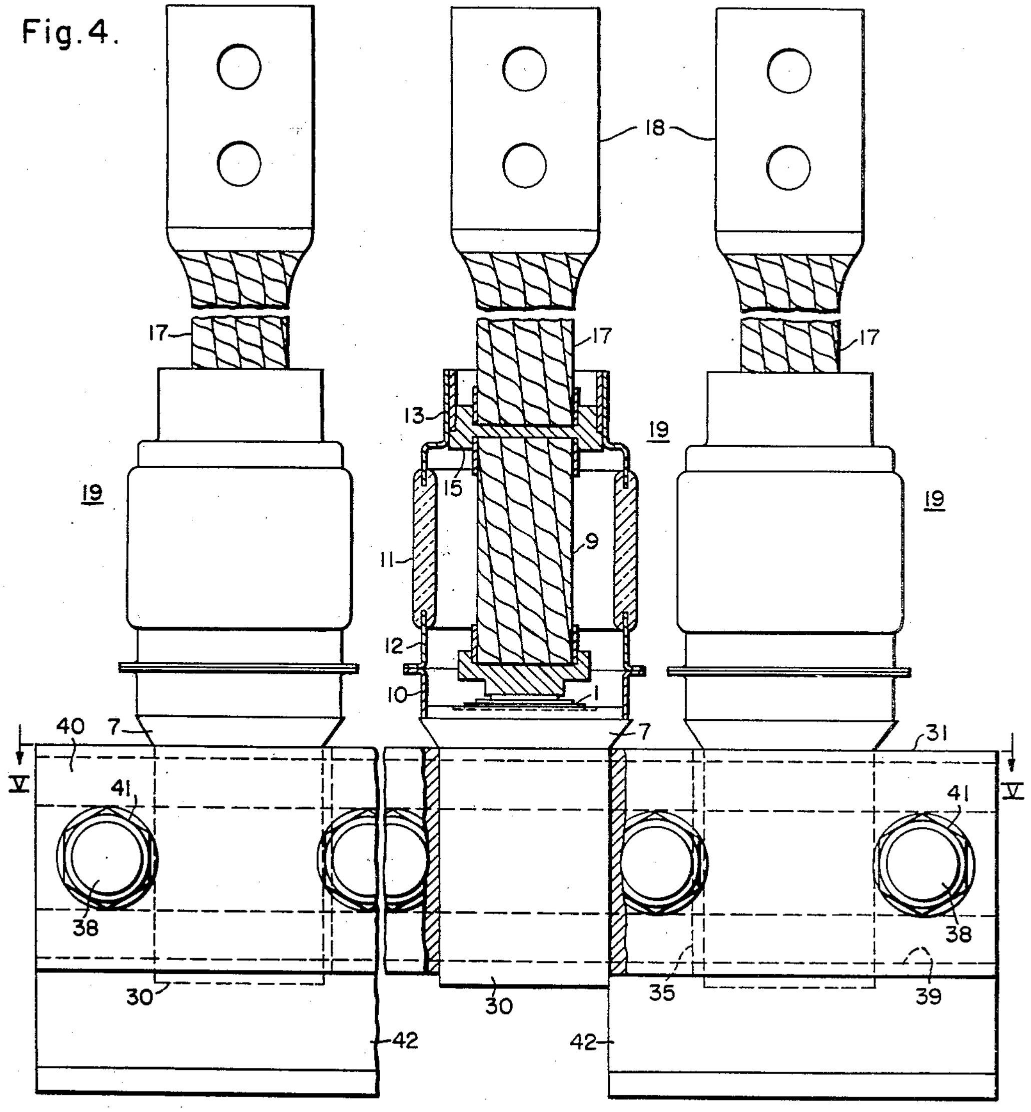
Fig. 4 is a view in elevation, and partly in vertical section, of a rectifier assembly showing another embodiment of the invention.
Figure 5:
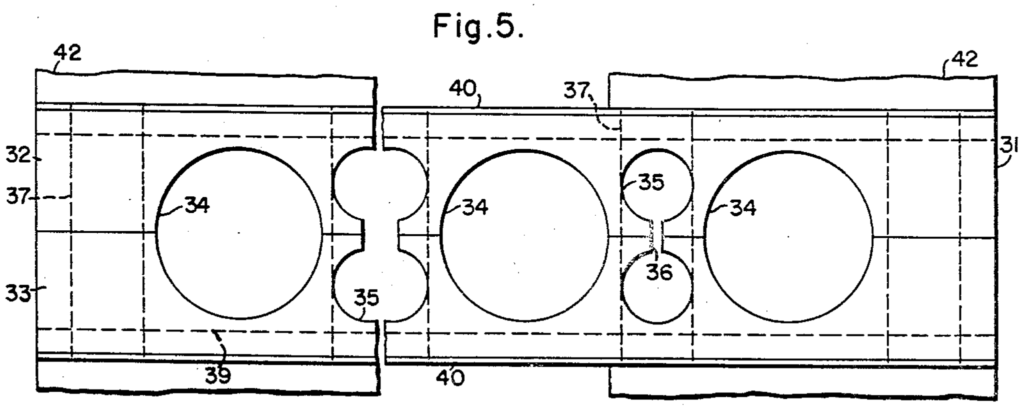
Fig. 5 is a plan view of the supporting conductor of Fig. 4.

Another embodiment of the invention is shown in Figs. 4, 5 and 6. This embodiment is generally similar to that described above but avoids the difficulties that may be encountered in accurately machining conical surfaces in copper. The rectifier devices 19 shown in Fig. 4 are similar to those described above and the parts are designated by the same reference characters. In this embodiment of the invention, however, the downwardly extending portion 30 of the terminal member 7 is cylindrical and has no threaded portion.

The supporting conductor or bus bar 31 is divided longitudinally into two sections 32 and 33. Each of these sections has a plurality of vertical semi-circular grooves positioned so that the grooves of the two sections register to form circular openings 34, as shown in Fig. 5, which extend through the conductor 31. Smaller vertical holes 35 are drilled through each section of the conductor 31 in the spaces between the openings 34. The holes 35 are placed in corresponding positions in the two sections 32 and 33 and the pairs of holes are connected by slots 36 to provide some transverse flexibility in the heavy conductor 31. Transverse holes 37 are drilled through the two sections of the conductor 31 intersecting the holes 35, and also at the ends of the conductor, and clamping bolts 38 are placed in the holes 37. The conductor 31 is provided with longitudinal grooves or passages 39 on the outer sides of each of the sections 32 and 33, and these grooves are closed by plates 40 brazed on each side of the conductor with water-tight joints, so that the passages 39 serve for the circulation of water or other cooling liquid. Mounting brackets 42 of any desired type may be attached to the conductor 31 for supporting the assembly.

In assembling his structure, the cylindrical portions 30 of the rectifier devices 19 are inserted in the openings 34, which are made of the proper size to receive the portions 30 with a snug fit. The bolts 38 are then tightened by means of nuts 41 to clamp the rectifier portions 30 in the conductor 31, the holes 35 providing sufficient flexibility to permit tight clamping so as to obtain a good large-area contact between the terminal members 7 and the conductor 31. As before, the contacting surfaces may be silver plated if desired or a thin silver foil may be inserted between them to improve the contact.

It will be seen that the structure of Figs. 4, 5 and 6 is generally similar to that of Figs. 2 and 3. This structure is also adaptable either to water cooling by means of the passages 39 or to air cooling by omitting the water passages and providing fins on the conductor 31. It will also be obvious that this construction may be applied to a single rectifier device as well as to the multiple unit assembly shown.

In either type of construction described above, the rectifier devices 19 themselves are separated from the cooling system so that a rectifier can be removed and replaced, if necessary, without disturbing the cooling system. This is very advantageous, especially with water cooling, since it permits the use of a permanent water system with permanent connections, thus minimizing the possibility of leaks. In the case of a multiple unit assembly, such as shown in the drawings, the installation is greatly simplified since it is not necessary to provide separate water connections to each rectifier unit and thus a simpler and less expensive construction is provided. The use of a permanent cooling system also reduces the cost of the system while the cost of the rectifier units themselves is reduced because of the elimination of the cooling means.

In case of failure of a rectifier unit, the faulty unit is easily removed by removing the nut 29, in the structure of Fig. 2, or by loosening the bolts 38 on each side of the faulty unit in the structure of Fig. 4. The faulty unit can then readily be removed and a new one inserted in its place without disturbing the other units and without disturbing the cooling system.

Figure 7:
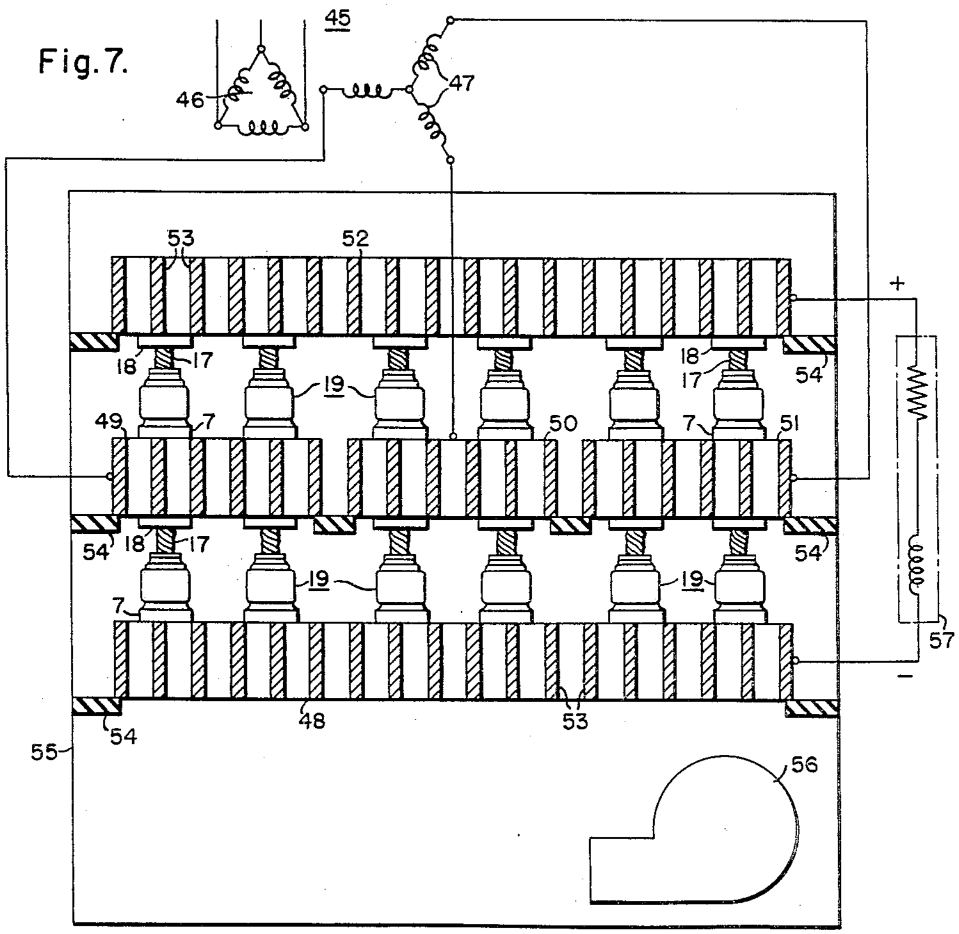
Fig. 7 is a somewhat diagrammatic view illustrating a further embodiment of the invention and showing typical electrical connections of a complete rectifier installation.

Fig. 7 shows somewhat diagrammatically a typical complete rectifier installation embodying the invention, and also illustrates the use of air cooling rather than water cooling. In this figure, there is shown a complete three-phase installation supplied from a power transformer 45 having delta connected primary windings 46 and Y-connected secondary windings 47. The illustrative connection shown is a conventional three-phase bridge circuit with two rectifier units in parallel in each leg of the bridge. The individual rectifier units 19 may be of any suitable construction such as that described above. As shown, six of the rectifier units are mounted on a direct current bus 48 and their terminals 18 are connected in pairs to three alternating current buses 49, 50 and 51. The remaining six rectifier units 19 are mounted in pairs on the alternating current buses 49, 50 and 51 and their terminals 18 are connected to the other direct current bus 52. All of the rectifier units may be identical except that the rectifier cells of the units connected to the direct current bus 52 must be inverted with respect to those mounted on the direct current bus 48. That is, in one group of rectifier units the rectifier cells 1 are mounted with the negative or cathode terminal 3 attached to the terminal member 7 while in the other group of rectifier units the rectifier cells are mounted with the positive or anode terminal 6 attached to the terminal member 7.

The buses 48 through 52 shown diagrammatically in Fig. 7 may be of either of the constructions described above but are shown as being arranged for air cooling rather than water cooling and thus the water passages are eliminated and fins 53 are provided on the buses. The buses are mounted, as shown, on insulating supports 54 of any suitable type in a suitable enclosure or housing, indicated at 55, and a blower 56 is preferably provided in the housing for forced circulation of air. The leads from the secondary windings 47 of the transformer 45 are connected to the alternating current buses 49, 50 and 51, respectively, and the direct current buses 48 and 52 are connected to the direct current load 57. It will be understood that many different physical arrangements are possible, depending on the size and desired circuit connections of a particular installation, and that Fig. 7 is only illustrative of one particular arrangement.

It should now be apparent that a semiconductor rectifier assembly has been provided in which the cooling means is separated from the rectifier itself but without any substantial loss in the effectiveness of cooling, giving the advantages described above of reducing cost and permitting easy replacement of a particular rectifier device without disturbing the cooling system. Certain specific embodiments of the invention have been shown and described for the purpose of illustration, but it will be apparent that various modifications may be made. Thus, for example, the rectifiers may be removably mounted on their supporting conductors in any suitable manner that will provide good thermal conductivity. For example, the extending portion of the terminal element 7 might be threaded and be screwed into corresponding threaded openings in the supporting conductor, or the terminal element 7 might be provided with a flat bottom surface and be soldered to the upper surface of the support conductor with a solder having a melting point such that it would not soften in normal operation but could be melted sufficiently to permit removal of the rectifier device if necessary. Various other modifications and embodiments will be apparent to those skilled in the art and all such modifications are within the scope of the invention.

We claim as our invention:

1. A rectifier assembly comprising a supporting conductor, means for dissipating heat from said conductor, a rectifier device including a terminal member, a semiconductor rectifier cell mounted on the terminal member, and a sealed enclosure for the rectifier cell, the terminal member having a base portion extending outside the sealed enclosure, said conductor having an opening adapted to receive the base portion of the terminal member, and means for clamping the base portion in said opening to secure the rectifier device to the conductor with a connection of good thermal and electrical conductivity.

2. A rectifier assembly comprising a supporting conductor, means for dissipating heat from said conductor, a plurality of rectifier devices, each of said rectifier devices including a terminal member, a semi-conductor rectifier cell mounted on the terminal member, and a sealed enclosure for the rectifier cell, the terminal member having a base portion extending outside the sealed enclosure, said conductor having a plurality of openings adapted to receive the base portions of the terminal members, and means for individually clamping said base portions in said openings with connections of good thermal and electrical conductivity.

3. A rectifier assembly comprising a supporting conductor, means for dissipating heat from said conductor, a rectifier device including a terminal member, a semiconductor rectifier cell mounted on the terminal member, and a sealed enclosure for the rectifier cell, the terminal member having a base portion extending outside the sealed enclosure, said base portion being substantially conical, said conductor having a substantially conical opening adapted to receive the base portion of the terminal member, and means for clamping the base portion in said opening.

4. A rectifier assembly comprising a supporting conductor, means for dissipating heat from said conductor, a rectifier device including a terminal member, a semiconductor rectifier cell mounted on the terminal member, and a sealed enclosure for the rectifier cell, the terminal member having a base portion extending outside the sealed enclosure, said base portion having a substantially conical section, said conductor having a substantially conical opening extending therethrough adapted to receive the conical section of said base portion, and threaded means at the end of the base portion for clamping the base portion in the opening.

5. A rectifier assembly comprising a supporting conductor, means for dissipating heat from said conductor, a plurality of rectifier devices, each of said rectifier devices, including a terminal member, a semiconductor rectifier cell mounted on the terminal member, and a sealed enclosure for the rectifier cell, the terminal member having a base portion extending outside the sealed enclosure, said base portions being substantially conical, said conductor having a plurality of substantially conical openings adapted to receive the base portions of the terminal members, and means for individually clamping the base portions in said openings.

6. A rectifier assembly comprising a supporting conductor, means for dissipating heat from said conductor, a rectifier device including a terminal member, a semiconductor rectifier cell mounted on the terminal member, and a sealed enclosure for the rectifier cell, the terminal member having a base portion extending outside the sealed enclosure, said base portion being substantially cylindrical, said conductor being longitudinally divided into two sections and having transverse grooves in each section, the grooves of the two sections registering to form a cylindrical opening adapted to receive said base portion, and means for clamping the sections of the conductor together to clamp the base portion in said opening.

7. A rectifier assembly comprising a supporting conductor, means for dissipating heat from said conductor, a plurality of rectifier devices, each of said rectifier devices including a terminal member, a semiconductor rectifier cell mounted on the terminal member, and a sealed enclosure for the rectifier cell, the terminal member having a base portion extending outside the sealed enclosure, said base portions being substantially cylindrical, said conductor being longitudinally divided into two sections and having transverse grooves in each section, the grooves of the two sections registering to form cylindrical openings adapted to receive said base portions, and clamping means adjacent each of said openings for clamping the sections of the conductor together to individually clamp the base portions in the openings.

References Cited in the file of this patent

UNITED STATES PATENTS

| | | |
|---|---|---|
| 2,353,461 | Hammann | July 11, 1944 |
| 2,725,505 | Webster et al. | Nov. 29, 1955 |
| 2,730,663 | Harty | Jan. 10, 1956 |
| 2,751,528 | Burton | June 19, 1956 |
| 2,754,455 | Pankove | July 10, 1956 |
| 2,756,374 | Colleran et al. | July 24, 1956 |

FOREIGN PATENTS

| | | |
|---|---|---|
| 296,666 | Great Britain | Nov. 15, 1928 |